(12) United States Patent  
Helmer

(10) Patent No.: US 7,021,334 B1  
(45) Date of Patent: Apr. 4, 2006

(54) FLUID COUPLING

(75) Inventor: Christopher R. Helmer, Hudsonville, MI (US)

(73) Assignee: BLD Products, Ltd., Holland, MI (US)

( * ) Notice: Subject to any disclaimer, the term of this patent is extended or adjusted under 35 U.S.C. 154(b) by 190 days.

(21) Appl. No.: 10/605,411

(22) Filed: Sep. 29, 2003

(51) Int. Cl.  
*F16K 51/00* (2006.01)

(52) U.S. Cl. .................. 137/615; 251/174; 285/69; 285/74; 280/421

(58) Field of Classification Search ............... 137/615; 251/174; 285/68, 69, 74; 280/421  
See application file for complete search history.

(56) References Cited

U.S. PATENT DOCUMENTS

| | | | |
|---|---|---|---|
| 3,245,428 A | | 4/1966 | Klimak et al. |
| 3,960,365 A | * | 6/1976 | Horowitz ............... 251/174 |
| 4,109,673 A | | 8/1978 | Horowitz et al. |
| 4,483,511 A | * | 11/1984 | Kushida et al. ............. 251/174 |
| 4,533,115 A | | 8/1985 | Lissau |
| 4,550,928 A | * | 11/1985 | Berg ......................... 280/421 |
| 4,590,967 A | | 5/1986 | Schmitt et al. |
| 4,852,915 A | | 8/1989 | Campanini |
| 5,348,043 A | * | 9/1994 | Chimera .................... 137/269 |

* cited by examiner

*Primary Examiner*—Kevin Lee  
(74) *Attorney, Agent, or Firm*—McGarry Bair PC

(57) ABSTRACT

The invention provides a fluid coupling for coupling a fluid source with a fluid supply line. The fluid coupling comprises a gladhand mounted to a body via a swivel connection. The gladhand is movable between a stored and protected position, wherein an outlet of the gladhand rests against a rubber cup to prevent fluid flow therefrom, and a use position, wherein the gladhand is removed from the rubber cup and can be connected to a fluid supply line. Additionally, the fluid coupling comprises a valve assembly preferably disposed in the body. The valve is operable between open and closed positions to effectively turn the fluid coupling on and off.

35 Claims, 6 Drawing Sheets

FLUID COUPLING

BACKGROUND OF INVENTION

1. Field of the Invention

The invention relates generally to a fluid coupling to connect a fluid source line to a fluid supply line. More particularly, the invention relates to a gladhand for coupling the fluid lines of a tractor-trailer brake system. The gladhand has a swivel connection and comprises an internal valve to control the flow of fluid therethrough.

2. Description of the Related Art

Braking systems for tractor-trailers are typically pneumatic and rely on an air source located on the tractor. Air supply lines deliver air from the source to the braking system components on the trailer or trailers and comprise various types of hoses and couplings. Such hoses, couplings, and the like have standardized interconnections because the tractor-trailer is a modular assembly, wherein the trailer can be viewed as an interchangeable component. A single tractor can link to any trailer and can pull more than one trailer at a time, depending on the size and weight of the trailers. Therefore, the pneumatic braking system of a trailer must be able to communicate with that of any tractor, and, likewise, trailers must be able to connect with each other.

An example of a standardized coupling is a gladhand, which is well-known in the art and is designed to mate and seal with another gladhand to permit fluid communication between a trailer and a tractor or between trailers. Gladhands can be located on either the front or rear end of a trailer. A gladhand on the front of a trailer can be joined with the air source on the tractor. When located on the rear of a trailer, a gladhand is used for connection to another trailer.

An inline shutoff is normally located in the pneumatic line upstream of the gladhand at the rear of the trailer. If an additional trailer is not employed, the inline shutoff valve is closed to prevent the escape of the air through the rear gladhand. However, even if the inline valve is in the off position, the unconnected gladhand outlet is susceptible to contamination by bugs, dirt, and other debris, especially from the debris cloud formed by the moving trailer. The contamination can enter the air flow path of the brake system when the inline valve is later opened, which can be detrimental to the performance of the brake system. Additionally, when a trailer is not in tandem with a tractor, it often sits in an outdoor trailer yard. As a result, any gladhands on the trailer are exposed to potential contaminants in the environment.

SUMMARY OF INVENTION

The invention disclosed herein addresses the problems of the related art and comprises a fluid coupling that couples the fluid lines of a tractor-trailer brake system and has a swivel connection and an internal valve to selectively control the flow of fluid therethrough.

In one aspect, the invention relates to a fluid coupling to couple a fluid source line to a fluid supply line. The fluid coupling comprises a body defining a fluid flow path having an inlet and an outlet; a valve located within the body to control the flow of fluid through the flow path and operable between an open position, where fluid can flow through the body along the flow path, and a closed position, where fluid is prevented from flowing through the body along the flow path; and a gladhand moveably mounted to the body and operable between a stored position and a use position. The gladhand comprises a face having an outlet, an inlet fluidly connected to the outlet of the body, and a flow path extending between the gladhand inlet and the gladhand outlet. Fluid is permitted to flow through the body and out the gladhand when the valve is in the open position and the gladhand is in the use position by the fluid entering the body flow path through the body inlet, exiting the body flow path through the body outlet, entering the gladhand flow path through the gladhand inlet, and exiting the gladhand flow path through the gladhand outlet.

The body comprises a swivel connection to moveably mount the gladhand to the body. The swivel connection can be disposed between the valve and the gladhand, or the valve can be disposed between the swivel connection and the gladhand.

The body further comprises an upper body portion and a lower body portion, wherein the lower body portion includes a nipple that is received within the upper body portion, and at least one seal is disposed between the nipple and the upper body portion. The swivel connection is located between the upper and lower body portions. The upper body portion comprises an arm to which the gladhand inlet is connected, and the swivel connection comprises a biasing device to bias the arm such that the gladhand is in the stored position while permitting the rotating of the gladhand into the use position. The biasing device is a torsion spring having a first finger coupled to the upper body portion and a second finger coupled to the lower body portion. A bearing is positioned between the upper body portion and the lower body portion.

Additionally, the fluid coupling comprises a mounting bracket, wherein the mounting bracket fixedly mounts the lower body portion, rotatably mounts the upper body portion, and prevents linear movement between the lower and upper body portions. The mounting bracket comprises a support arm with a cover at its distal end, wherein the face of the gladhand rests against the cover when the gladhand is in the stored position such that the cover closes the gladhand outlet and prevents fluid from exiting and dust and debris from entering the gladhand fluid flow path.

The valve comprises a rotatable valve member having a passageway located therethrough, wherein when the valve is in the open position, the passageway is substantially coaxial with the body flow path, and when the valve is in the closed position, the passageway is substantially transverse to the body flow path. The valve further comprises a handle to manually rotate the rotatable valve member from the open position to the closed position.

A bushing has a top surface adjacent the rotatable valve member, and the top surface forms a seal between the bushing and the rotatable valve member. At least one biasing member urges the bushing against the rotatable valve member, particularly against a ball-shaped portion of the rotatable valve member. A seal is disposed between the bushing and the body.

In another aspect, the invention relates to a gladhand comprising a face having an outlet; a body having an inlet and defining a flow path extending between the inlet and the outlet to fluidly couple the body to the face; a valve located within the flow path to control the flow of fluid through the flow path and operable between an open position, where fluid can flow through the gladhand along the flow path, and a closed position, where fluid is prevented from flowing through the gladhand along the flow path; and a swivel connection for movably mounting the face between a use position; where fluid can flow through the outlet, and a stored position, where fluid is prevented from exiting the outlet. Fluid is permitted to flow through the gladhand when the valve is in the open position and the gladhand is in the use position by the fluid entering the flow path through the inlet, flowing through the flow path, and exiting the flow path through the outlet. The swivel connection can be disposed between the valve and the face, or the valve can be disposed between the swivel connection and the face.

The body comprises an upper body portion and a lower body portion, wherein the lower body portion includes a nipple that is received within the upper body portion, and at least one seal member is disposed between the nipple and the upper body portion. The swivel connection is disposed between the upper and lower body portions. The upper body portion comprises an arm on which the face is disposed, and the swivel connection comprises a biasing device to bias the arm such that the gladhand is in the stored position while permitting the rotating of the gladhand into the use position. The biasing device is a torsion spring having a first finger coupled to the upper body portion and a second finger coupled to the lower body portion.

The gladhand further comprises a mounting bracket, wherein the mounting bracket fixedly mounts the lower body portion, rotatably mounts the upper body portion, and prevents linear movement between the lower and upper body portions. The mounting bracket comprises a support arm with a cover at its distal end, wherein the face of the gladhand rests against the cover when the gladhand is in the stored position such that the cover closes the gladhand outlet and prevents fluid from exiting and dust and debris from entering the gladhand fluid flow path.

The valve comprises a rotatable valve member having a passageway located therethrough, wherein when the valve is in the open position, the passageway is substantially coaxial with the flow path, and when the valve is in the closed position, the passageway is substantially transverse to the flow path. The valve further comprises a handle to manually rotate the rotatable valve member from the open position to the closed position.

A bushing has a top surface adjacent the rotatable valve member, wherein the top surface forms a seal between the bushing and the rotatable valve member. At least one biasing member urges the bushing against the rotatable valve member, particularly a ball-shaped portion of the rotatable valve member. A seal is disposed between the bushing and the body.

DETAILED DESCRIPTION

Figure 1:
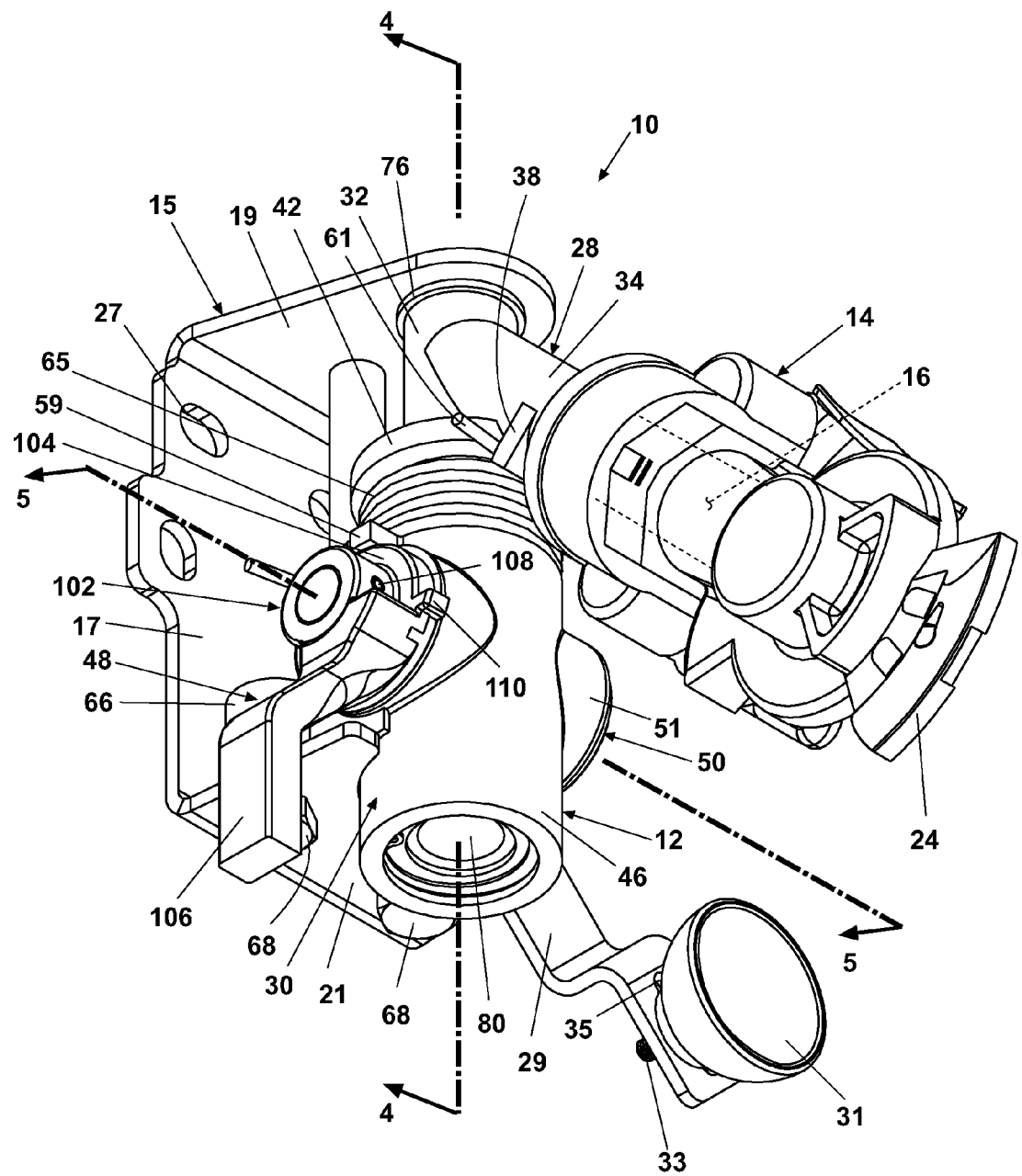
FIG. 1 is a perspective view of a fluid coupling comprising a gladhand, a swivel connection, and a valve according to the invention, wherein the gladhand is in a use position for connection to another gladhand and the valve is in an open position where fluid can flow therethrough.

The invention provides an improved fluid coupling device that comprises a gladhand having a swivel connection and an integrated valve. In general, the coupling can be employed to couple a fluid source line with a fluid supply line. For example, the fluid coupling can be used on the rear end of a trailer, where it connects a line in fluid communication with a source of fluid, typically located on a tractor, to a line that is in communication with components, typically parts of a brake system on a trailer in tandem, that require a supply of fluid for operation. Additionally, the fluid coupling can be turned on or off and is protected from the environment when not in use.

Referring now to the figures and FIGS. 1–4 in particular, a fluid coupling 10 according to the invention comprises a body 12 and a gladhand 14. The body 12 is preferably mounted to a bracket 15. The bracket 15 comprises a generally flat upright 17 with forwardly disposed projections 19, 21 at the top and bottom. The flat upright 17 has several openings 27 to aid in mounting the fluid coupling to a surface on, for example, a trailer or a tractor. The top projection 19 has two openings, a forward opening 23 and a rearward opening 25. The bottom projection 21 also has two openings 11, which are arranged in a generally horizontal orientation. Furthermore, the bracket 15 comprises a support arm 29 that is welded or otherwise suitably secured to the flat upright 17. A cover, which is illustrated as a rubber cup 31, is mounted at the distal end of the support arm 29 via a bolt or stud 33, which passes through a slot 35 in the support arm 29. The position of the rubber cup 31 can be altered by sliding the bolt 33/rubber cup 31 within the slot 35.

Figure 4:
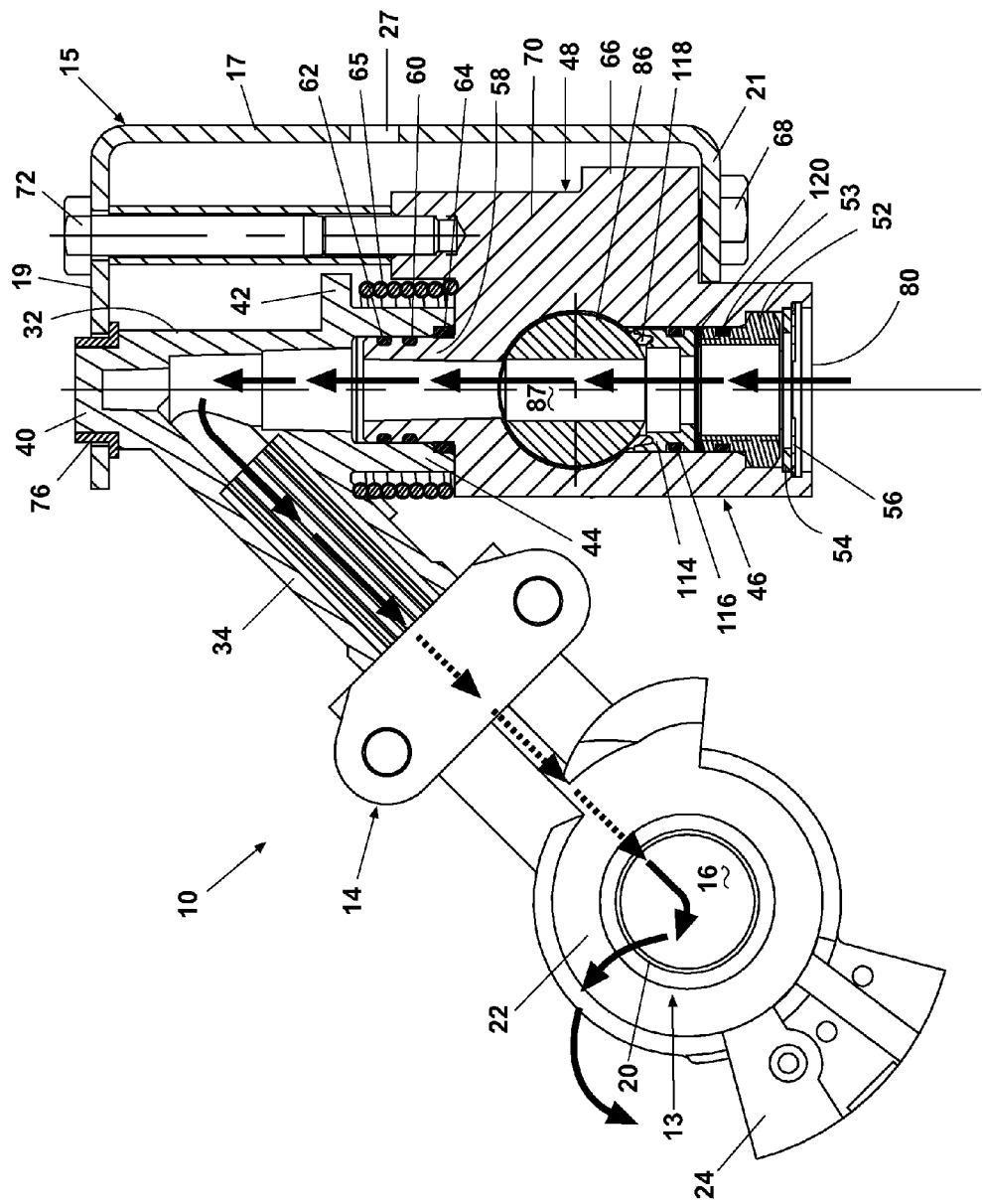
FIG. 4 is a partial sectional view of the fluid coupling of FIG. 1 taken along line 4—4 of FIG. 1.

The gladhand 14 is a well-known device in the art. Certain aspects of the gladhand 14 are determined by industry standards, such as those set by the Society of Automotive Engineers (SAE). A gladhand is described in detail in U.S. Pat. No. 3,960,365, which is incorporated by reference. Therefore, the gladhand 14 will only be described in general herein. The gladhand 14 typically comprises an internal air chamber 16 defining a fluid flow path having an inlet 18 and an outlet 20, wherein the outlet 20 is surrounded by a conventional gladhand seal 22, usually an annular-shaped rubber member. The outlet 20 and the seal 22, which are best viewed in FIG. 4, are commonly referred to as a face 13 of the gladhand 14. The seal 22 is disposed between a first camming surface 24 and a second camming surface 26, which mate with similar surfaces of an opposing gladhand, i.e. the second camming surface 26 receives the first camming surface of an opposing gladhand and vice versa. The second camming surface 26 is typically mounted to the gladhand 14 with bolts or other type of mechanical connector. The inlet 18 is equipped with means, such as a threaded connection, for coupling with the body 12 of the fluid coupling 10.

The body 12 of the fluid coupling 10 comprises a hollow upper body portion 28 and a hollow lower body portion 30, which rotatably mount to each other. The upper body portion 28 has an upright portion 32 and an integral arm 34 disposed at an angle, which as illustrated is approximately forty-five degrees, relative to the upright portion 32. The arm 34 has a threaded end 36 designed to mate with the threaded inlet 18 of the gladhand 14. Further, a projection or abutment 38, whose purpose will be described hereinafter, is located on the exterior arm surface facing the upright portion 32. The upright portion 32 comprises an integral riser or trunnion 40 at its upper end. A stop collar 42 is disposed towards the lower end of the upright portion 32, and below the stop collar 42 is a region 44 of increased outer diameter.

The lower body portion 30 comprises a hollow valve body 46 and a rear mounting member 48, which is best seen in FIG. 4. The valve body 46 has a generally cylindrical shape and houses a valve assembly 50 within a transverse bore 51. The valve assembly 50 will be described in detail hereinafter. An upwardly extending nipple 58 is located at the upper end of the valve body 46. The valve body 46 further comprises a stop member 59 on the exterior surface thereof disposed above the bore 51. A fitting 52, easily seen in FIG. 3, for connection to other various components of the fluid system is disposed in the lower end of the valve body 46. A seal, such as an O-ring 53, surrounds the fitting 52 to ensure a fluid-tight fit between the fitting 52 and the valve body 46. The fitting 52 is retained in position by a washer 54 and a ring 56.

Referring again to FIG. 3, the valve assembly 50 in the lower body portion 30 comprises a rotatable valve member 84 having a center ball-shaped portion 86 with a passage 87 extending therethrough. At the sides of the ball-shaped portion 86, the valve assembly 50 has coaxial first and second shafts 88, 90, both of which fit within the bore 51 of the lower body portion 30. Both shafts 88, 90 carry O-rings 92, 94 to form seals between the rotatable valve member 84 and the lower body portion 30. A stem 100 extends outwardly from the second shaft 90 and comprises an aperture 109 perpendicular to the longitudinal axis thereof.

A handle assembly 102 is attached to the end of the stem 100 for use in rotating the rotatable valve member 84. The handle assembly 102 has a collar 104 and a handle 106 that extends therefrom. The collar 104 is retained on the stem 100 by a pin 108 that is received in the aperture 109. Additionally, bearing washers 96, 98, preferably composed of a polymer, such as nylon, are disposed between the collar 104 and the lower body portion 30 and between the rotatable valve member 84 and the lower body portion 30 to prevent metal-to-metal contact during rotation of the valve assembly 50. The collar 104 has a first stop flat 110 near the handle 106 and a second stop flat 112 spaced approximately one-quarter of the circumference of the collar 104 from the first stop flat 110. The stop flats 110, 112 face each other, and the stop member 59 on the lower body portion 30 is situated therebetween such that the stop flats 110, 112 form limit stops for the stop member 59.

Figure 2:
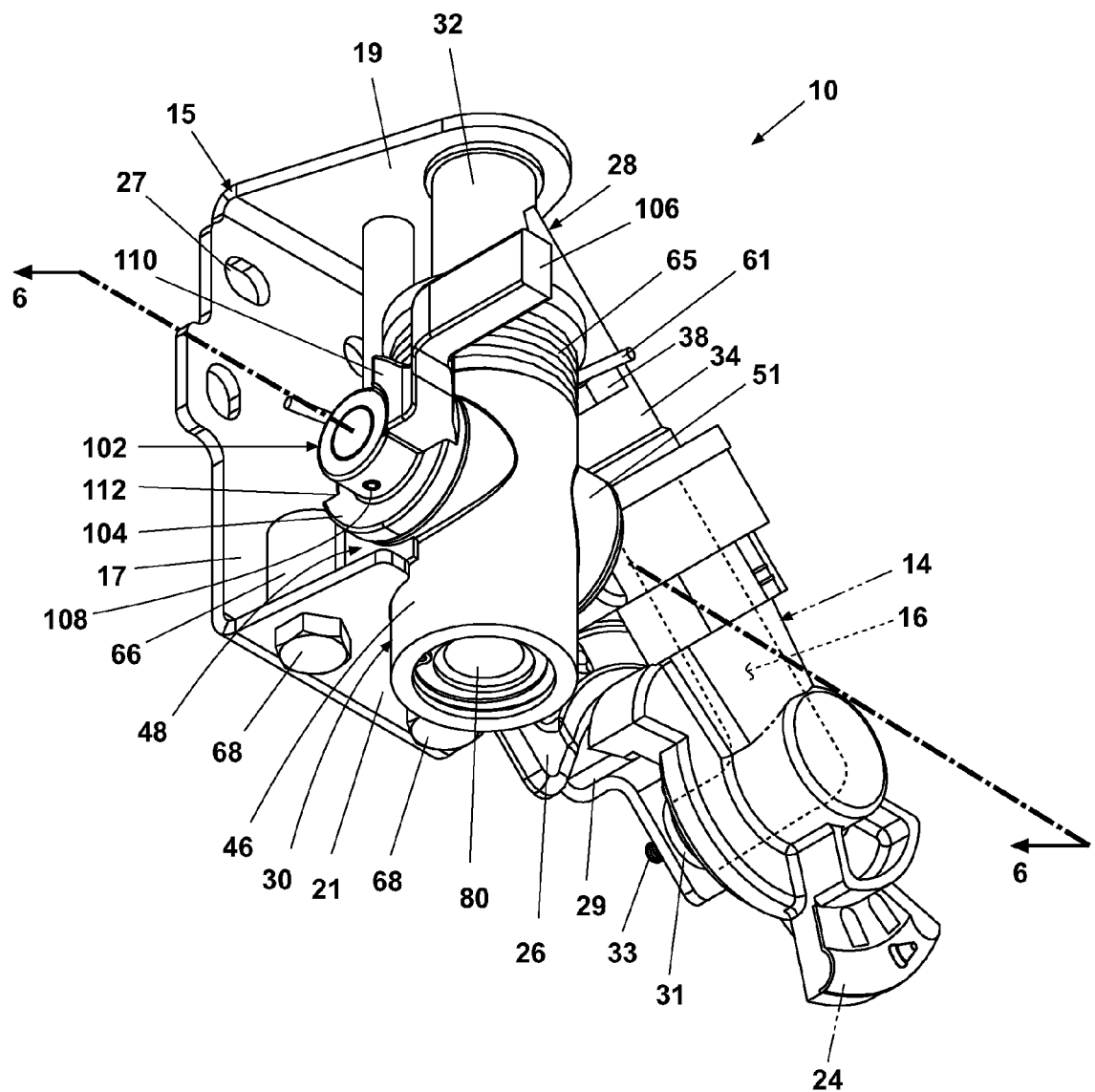
FIG. 2 is a perspective view of the fluid coupling of FIG. 1, wherein the gladhand is in a stored position and the valve is in a closed position to prevent air flow therethrough.
Figure 3:
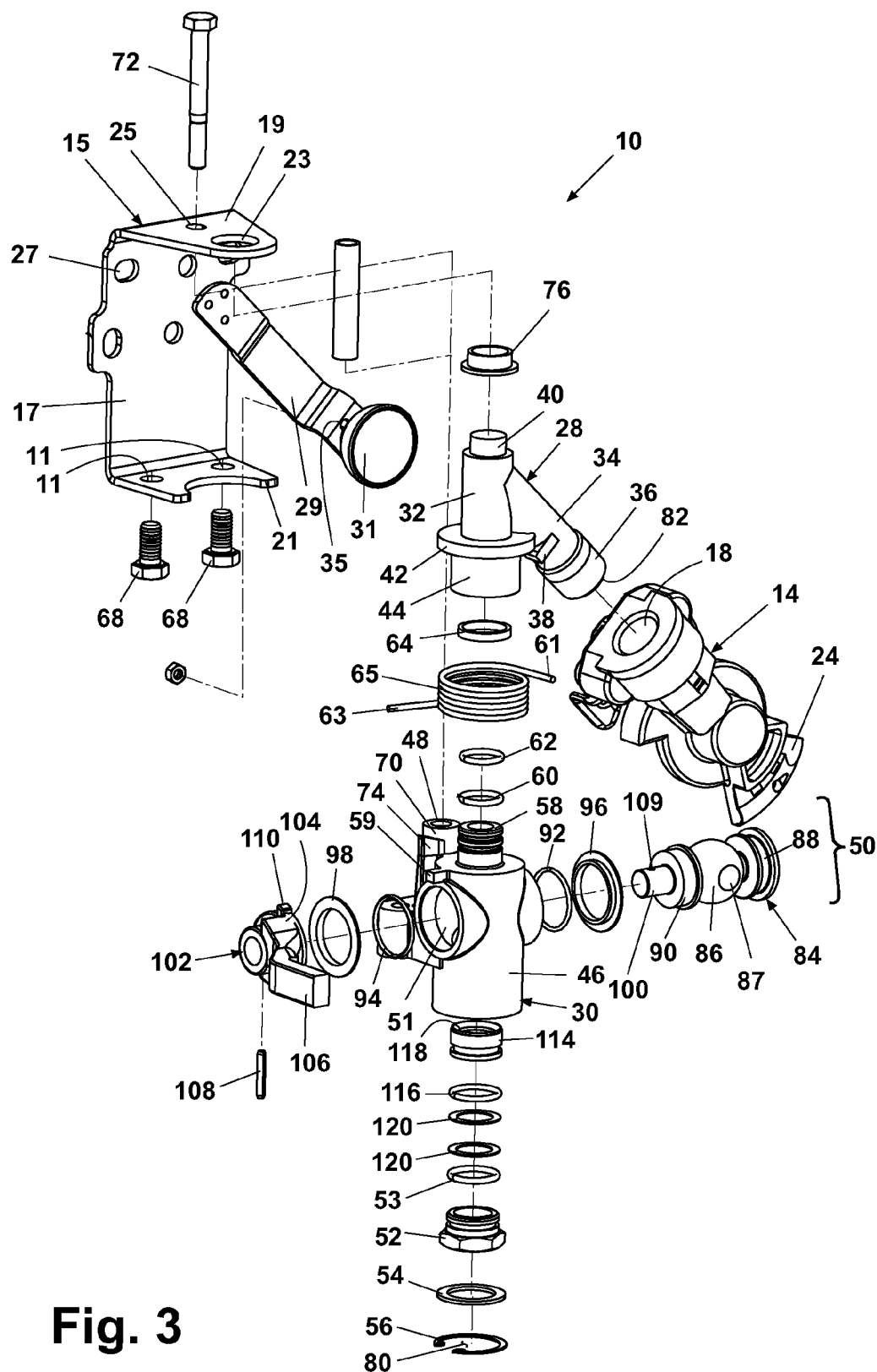
FIG. 3 is an exploded view of the fluid coupling of FIG. 2.
Figure 5:
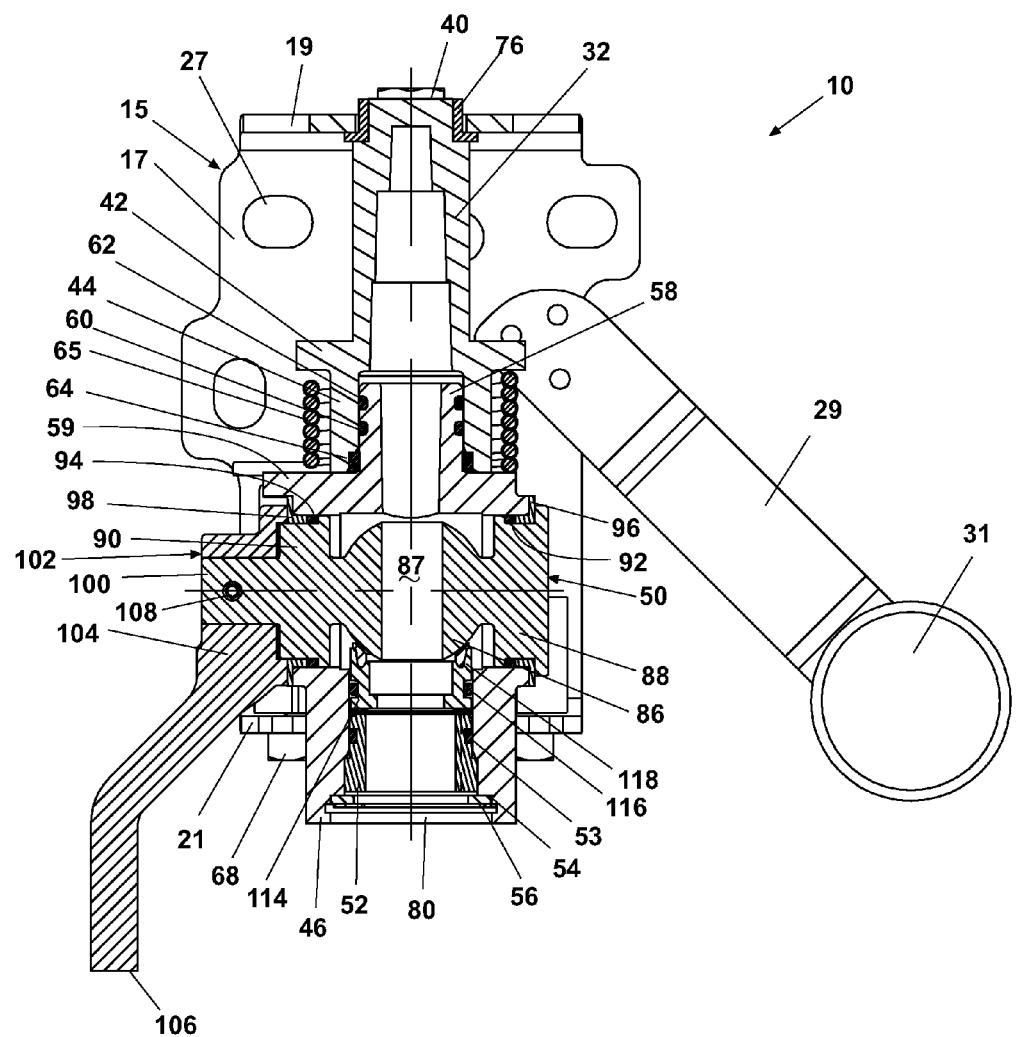
FIG. 5 is a sectional view of the fluid coupling of FIG. 1 taken along line 5—5 of FIG. 1.
Figure 6:
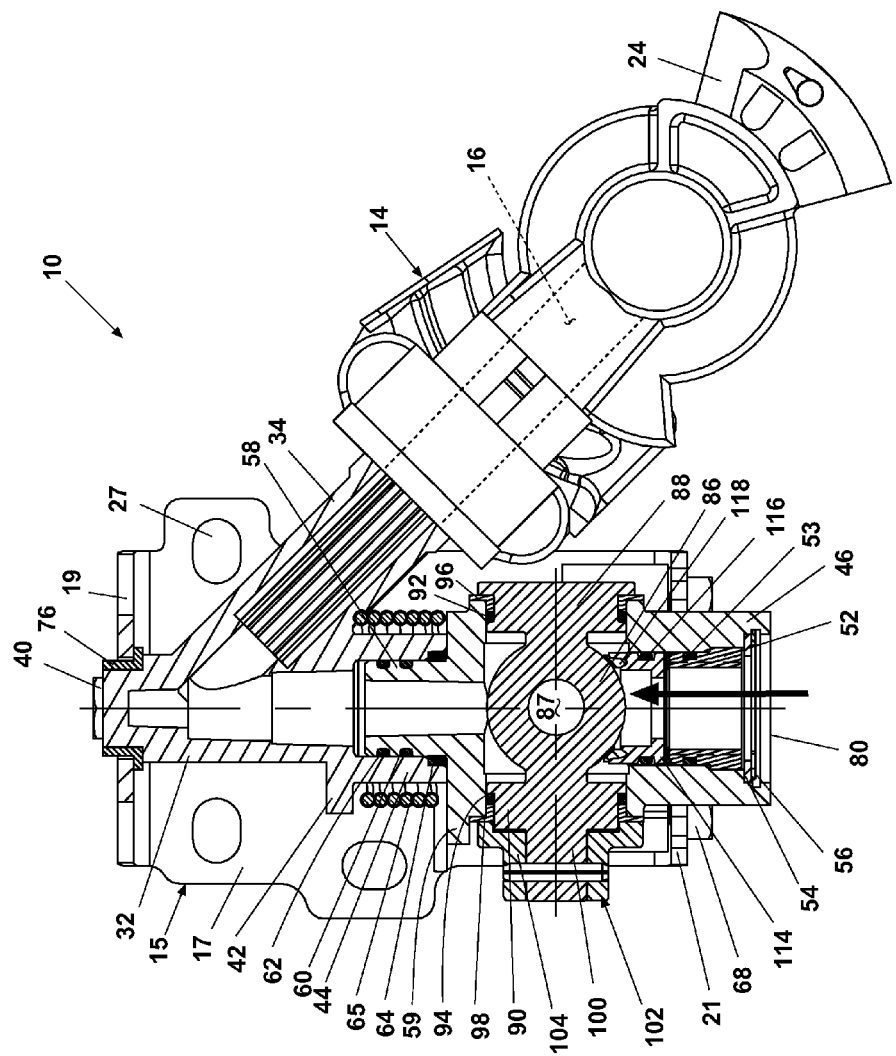
FIG. 6 is a partial sectional view of the gladhand of FIG. 2 taken along line 6—6 of FIG. 2.

In this configuration, the rotatable valve member 84 can be moved between an open position and a closed position. In the open position, the ball-shaped portion 86 is oriented such that the passage 87 therethrough is in axial alignment with the cylindrical valve body 46 of the lower body portion 30, as seen in FIGS. 1, 4, and 5. The handle 106 is preferably in the same axial orientation as the passage 87; therefore, in the open position, the handle 106 is pointed downwards, and the stop member 59 abuts the second stop flat 112. In the closed position, the ball-shaped portion 86 is rotated approximately ninety degrees relative to the open position such that the passage 87 is transverse to the longitudinal axis of the cylindrical valve body 46, as seen in FIGS. 2, 3, and 6. The handle 106 is also rotated approximately ninety degrees relative to the open position, and the stop member 59 abuts the first stop flat 110.

The valve assembly 50 further comprises a hollow bushing 114, as best seen in FIG. 3, disposed between the ball-shaped portion 86 of the rotatable valve member 84 and the fitting 52 in the lower body portion 30. The bushing 114 carries an O-ring 116 for a fluid seal between the bushing 114 and the interior of the lower body member 30. Furthermore, the bushing 114 has a generally concave upper surface 118 for sealing between the bushing 114 and the ball-shaped portion 86. At least one wave washer 120 or spring is located between the bushing 114 and the fitting 52 to urge the bushing 114 and, therefore, the concave surface 118 towards the ball-shaped portion 86 of the rotatable valve member 84.

The mounting member 48 of the lower body portion 28 functions as a support for mounting the bracket 15 to the fluid coupling 10. The mounting member 48 is generally T-shaped, with a horizontal part and a vertical part 70. The horizontal part comprises two flanges 66, each of which is threaded to receive a bolt 68. The vertical part 70 extends upwardly from a region between the flanges 66 and is also threaded to receive a bolt 72. Further, a projection or abutment 74, whose purpose will be described hereinafter, is located on the vertical part 70 near the valve body 46.

The nipple 58 of the lower body portion 30 and the region 44 of the upper body portion 28 are sized such that the nipple 58 can be inserted into the region 44 to couple the upper and lower body portions 28, 30. At least one and preferably two O-rings 60, 62 surround the nipple 58 and create a seal between nipple 58 and the interior wall of the region 44 of the upper body portion 28 when the body 12 is assembled. Additionally, a bearing, such as a washer 64, is positioned between the mating parts 58, 44 of the upper and lower body portions 28, 30. It is critical that the seal between the upper and lower body portions 28, 30 and other seals in the fluid coupling 10 are fluid-tight. Leakage of air though the fluid coupling 10 could be detrimental to the pneumatic brake system and, therefore, the safety of the vehicle.

When coupled, the interior of the upper and lower body portions 28, 30 define a fluid flow path, which is depicted by arrows in FIG. 4, having an inlet 80 at the lower end of the lower body portion 30 and an outlet 82, which is best seen in FIG. 3, at the distal end of the arm 34 of the upper body portion 28. Therefore, the fluid flow path of the body 12 begins at the inlet 80, runs through the valve body 46 of the lower body portion 30, including the fitting 52, the bushing 114, the passage 87 when the valve assembly 50 is in the open position, and the nipple 58, continues through the upper body portion 28, including the upright portion 32 and the arm 34, and ends at the outlet 82. At the outlet 82, the body fluid flow path is in communication with the gladhand fluid flow path, which begins at the gladhand inlet 18, extends through the gladhand 14, and ends at the gladhand outlet 20. If the valve assembly 50 is in the closed position, then the ball-shaped portion 86 of the rotatable valve member 84 acts as a fluid flow barrier within the fluid flow path of the body 12, as shown by an arrow in FIG. 6.

When the assembled body 12 is mounted to the bracket 15, the trunnion 40 of the upper body portion 28 extends through the forward opening 23 and protrudes slightly above of the top forward projection 19 of the bracket 15. A flange 76, preferably composed of a polymeric material, is disposed between the trunnion 40 and the top forward projection 19. There is a clearance between the trunnion 40 and the forward projection 19 such that the trunnion 40 is able to rotate axially within the forward opening 23. Additionally, the body 12 is fixed within the bracket 15 by the bolt 72 that extends through the rearward opening 25 of the bracket 15 and into the threaded opening in the vertical part 70 of the lower body portion 30. Similarly, the bolts 68 extend through the openings 11 in the bracket 15 and into the corresponding threaded openings in the flanges 66 of the lower body portion 30.

To create a swivel connection between the upper and lower body portions 28, 30, a torsion spring 65 having a first finger 61 and a second finger 63 surrounds the region 44 of the upper body portion 28. The first finger 61 of the torsion spring 65 is disposed on the upper body portion 28 between the abutment 38 on the arm 34 and the stop collar 42 of the upright portion 32. The second finger 63 of the torsion spring 65 is supported by the abutment 74 on the mounting member 48 of the lower body portion 30. The torsion spring 65 exerts a force sufficient to bias the arm 34 and, therefore, the gladhand 14 towards a stored position, wherein the gladhand seal 22 is in contact with the rubber cup 31, as shown in FIGS. 2, 3 and 6. In this position, the outlet 20 is preferably completely disposed within the periphery of the rubber cup 31. However, the arm 34 can be rotated against the bias of the torsion spring 65 such that the gladhand 14 is in a use position, wherein the gladhand seal 22 and outlet 20 are removed from the rubber cup 31. During rotation, the clearance between the trunnion 40 and the forward opening 23 permits the upper body portion 28 and gladhand 14 to pivot relative to the bracket 15 and the lower body portion 30.

Assembly steps, which are described hereinafter, for the fluid coupling 10 can proceed in any reasonable order. The assembly as described is exemplary and is for better understanding of the invention. The following description is not meant to limit the assembly sequence in any respect. To assemble the fluid coupling 10, the torsion spring 65 is placed onto the region 44 of the upper body portion 28 with the upper end of the torsion spring 65 between the stop collar 42 and the arm abutment 38. The lower body portion 30, with the valve assembly 50 and fitting 52, is coupled with the upper body portion 28 by placing washer 64 over the nipple 58 and inserting the nipple 58, equipped with O-rings 60, 62, into the region 44 such that the lower end of the torsion spring 65 is supported by the abutment 74 on the mounting member 48 of the lower body member 30.

The assembled body 12 is placed onto the bracket 15 by placing the flange 76 on the trunnion 40 of the upper body portion 28 and inserting the trunnion 40 into forward opening 23 of the bracket 15. The body 12 is fixed within the bracket by inserting the bolt 72 through the rearward opening 25 of the bracket 15 and into the threaded opening in the vertical part 70 of the lower body portion 30. Similarly, the bolts 68 are inserted through the openings 11 in the bracket 15 and into the corresponding threaded openings in the flanges 66 of the mounting member 48 of the lower body portion 30. The bracket, therefore, fixedly mounts the lower body portion 30 and rotatably mounts the upper body portion 28. As a result, when the bracket 15 is mounted to a trailer, the lower body portion 30 is fixed relative to the trailer while the upper body portion 28 can rotate relative to the trailer. Furthermore the bracket 15 fixes the upper and lower body portions 28, 30 in a linear arrangement and prevents linear movement therebetween, which ensures that the fluid-tight seals between the body members 28, 30 are not compromised.

At any time during assembly of the fluid coupling 10, the gladhand 14 is attached to the body 14 via the threaded gladhand inlet 18 and the threaded end 36 of the arm 34. Also, the rubber cup 31 is mounted to the support arm 29 on the bracket 15 by inserting the bolt 33 through the slot 35 and coupling the bolt 33 with the rubber cup 31. This step can also be conducted at any time during the assembly process.

In operation, the fluid coupling 10 is mounted to a surface via the bracket 15 and connected to the fluid source line. The surface can be located on a tractor, a trailer, or any other suitable site. The fluid coupling 10 preferably couples a fluid source line to a fluid supply line of a fluid system. The fluid source line comprises any of the fluid system components disposed between the fluid source and the fluid coupling 10, and the fluid supply line comprises any of the fluid system components disposed on the side of the fluid coupling 10 opposite the fluid source. The fluid supply line delivers fluid to components of the fluid system that employ the fluid for operation. In the tractor-trailer application, the fluid source is commonly located on the tractor and the components, typically brake system components, that employ the fluid for operation are frequently on one or more trailers behind the tractor. For exemplary purposes, the remainder of the operation will be described for a fluid coupling 10 fixed to the rear end of a trailer that is directly behind the tractor. However, the same operation applies to a fluid coupling 10 positioned on the rear of a tractor, on the front end of any trailer in the tractor-trailer assembly, including a trailer directly behind the tractor, or on the rear end of any other trailer in the tractor-trailer assembly.

The initial positions of the gladhand 14 and the valve assembly 50 of the mounted fluid coupling 10 should be the stored position and the closed position, respectively. Due to the bias of the torsion spring 65, the gladhand 14 is automatically in the stored position. The valve assembly 50, however, is not biased to either the closed position or open position. If the valve assembly 50 is in the open position, it is moved to the closed position by rotating the handle 106 until the stop member 59 abuts the first stop flat 110 of the handle assembly 102. In this orientation, shown in FIGS. 2, 3, and 6, the ball-shaped portion 86 of the rotatable valve member 84 blocks the body flow path because the passage 87 is transverse relative thereto. Additionally, since the gladhand 14 is in the stored position, the outlet 20 of the gladhand fluid flow path is effectively plugged by the rubber cup 31.

As long as the fluid coupling 10 is not connected to a fluid supply line, it remains in the above configuration to prevent undesired fluid leakage through the fluid coupling 10 and to protect the gladhand outlet 20. Because the rubber cup 31 covers the outlet 20, dirt, dust, bugs, grease, and other environmental debris cannot enter and contaminate the gladhand fluid flow path, whether the trailer is moving or stationary.

If the fluid coupling 10 is to function as a coupling between the fluid source line and the fluid supply line of, for example, a second trailer, then the gladhand 14 and the valve assembly 50 are moved, in no particular order, to the use and open positions, shown in FIGS. 1, 4, and 5. To move the valve assembly 50 to the open position, the handle 106 is rotated until the stop member 59 abuts the second stop flat 112 of the handle assembly 102. In this orientation, the passage 87 is in axial alignment with the body fluid flow path.

The gladhand 14 is moved to the use position by manually forcing the arm 34 and, therefore, the gladhand 14 away from the rubber cup 31 so that the gladhand seal 22 and outlet 20 are available for connection to the fluid supply line. If the fluid supply line is coupled to the gladhand 14 via a second gladhand, the gladhand 14 and the second gladhand are joined in the conventional manner briefly described above.

When the gladhand 14 and the valve assembly 50 are in the use and open positions, fluid is permitted to flow from the fluid source line, into to body inlet 80, through the body fluid flow path, out the body outlet 82, in the gladhand inlet 18, through the gladhand fluid flow path, and out the gladhand outlet 20 to the fluid supply line.

To disconnect the fluid coupling 10 from the second trailer, the gladhand 14 and the valve assembly 50 are returned to the stored and closed positions. Once the gladhand 14 and the second gladhand are separated, the gladhand 14 is automatically biased towards the rubber cup 31 into the stored position. The valve assembly 50 is moved to the closed position in the same manner as described above.

The current invention should not be limited to the embodiment depicted in FIGS. 1–6. Certain components of the invention can be substituted with other means suitable for carrying out the intended functions. For example, several seals are accomplished by O-rings; however, it is within the scope of the invention for other types of sealing members, such as adhesives, to be employed. Additionally, the valve assembly need not be manually operated with a handle. Rather, the valve can have an actuator that can be operated from another part of the tractor-trailer, for example in the driver cabin of the tractor. Furthermore, the swivel connection can have a different configuration than that presented herein as long as the gladhand is biased into the stored position when not coupled with the fluid supply line.

The relative positioning of the elements in the fluid coupling can be altered from that depicted in FIGS. 1–6. For example, in the embodiment shown, the swivel connection is disposed above the valve assembly. It is within the scope of the invention to position the valve assembly between the swivel connection and the gladhand.

The fluid coupling according to the present invention offers several advantages. Effectively, the fluid coupling provides a gladhand that can easily be turned on and off and has reliable means for preventing contamination of the fluid flow path of the gladhand. This one-piece device comprises several robust seals between the various components so that fluid is not released through the coupling to the environment. Well-designed seals are critical for the safety tractor-trailer because they ensure that the brake system receives a proper volume of fluid at an appropriate pressure.

While the invention has been specifically described in connection with certain specific embodiments thereof, it is to be understood that this is by way of illustration and not of limitation, and the scope of the appended claims should be construed as broadly as the prior art will permit.

What is claimed is:

1. A fluid coupling to couple a fluid source line to a fluid supply line, the fluid coupling comprising:
   a body defining a fluid flow path having an inlet and an outlet;
   a valve located within the body to control the flow of fluid through the flow path and operable between an open position, where fluid can flow through the body along the flow path, and a closed position, where fluid is prevented from flowing through the body along the flow path; and
   a gladhand moveably mounted to the body operable between a stored position and a use position, the gladhand comprising a face having an outlet, an inlet fluidly connected to the outlet of the body, and a flow path extending between the gladhand inlet and the gladhand outlet;
   wherein fluid is permitted to flow through the body and out the gladhand when the valve is in the open position and the gladhand is in the use position by the fluid entering the body flow path through the body inlet, exiting the body flow path through the body outlet, entering the gladhand flow path through the gladhand inlet, and exiting the gladhand flow path through the gladhand outlet.

2. The fluid coupling according to claim 1, wherein the body further comprises a swivel connection to moveably mount the gladhand to the body.

3. The fluid coupling according to claim 2, wherein the swivel connection is disposed between the valve and the gladhand.

4. The fluid coupling according to claim 2, wherein the valve is disposed between the swivel connection and the gladhand.

5. The fluid coupling according to claim 1, wherein the body comprises an upper body portion and a lower body portion, wherein the lower body portion includes a nipple that is received within the upper body portion.

6. The fluid coupling according to claim 5, and further comprising at least one seal disposed between the nipple and the upper body portion.

7. The fluid coupling according to claim 6, wherein the body further comprises a swivel connection between the upper and lower body portions to moveably mount the gladhand to the body.

8. The fluid coupling according to claim 7, wherein the upper body portion comprises an arm to which the gladhand inlet is connected.

9. The fluid coupling according to claim 8, wherein the swivel connection comprises a biasing device to bias the arm such that the gladhand is in the stored position while permitting the rotating of the gladhand into the use position.

10. The fluid coupling according to claim 9, wherein the biasing device is a torsion spring having a first finger coupled to the upper body portion and a second finger coupled to the lower body portion.

11. The fluid coupling according to claim 5, wherein a bearing is positioned between the upper body portion and the lower body portion.

12. The fluid coupling according to claim 5 and further comprising a mounting bracket, wherein the mounting bracket fixedly mounts the lower body portion, rotatably mounts the upper body portion, and prevents linear movement between the lower and upper body portions.

13. The fluid coupling according to claim 12, wherein the mounting bracket comprises a support arm with a cover at its distal end, wherein the face of the gladhand rests against the cover when the gladhand is in the stored position such that the cover closes the gladhand outlet and prevents fluid from exiting and dust and debris from entering the gladhand fluid flow path.

14. The fluid coupling according to claim 1, wherein the valve comprises a rotatable valve member having a passageway located therethrough, wherein when the valve is in the open position, the passageway is substantially coaxial with the body flow path, and when the valve is in the closed position, the passageway is substantially transverse to the body flow path.

15. The fluid coupling according to claim 14, wherein the valve further comprises a handle to manually rotate the rotatable valve member from the open position to the closed position.

16. The fluid coupling according to claim 14, wherein the valve further comprises a bushing with a top surface adjacent the rotatable valve member, wherein the top surface forms a seal between the bushing and the rotatable valve member.

17. The fluid coupling according to claim 16, wherein the valve further comprises at least one biasing member to urge the bushing against the rotatable valve member.

18. The fluid coupling according to claim 17, wherein the rotatable valve member comprises a ball-shaped portion, and the bushing is urged against the ball-shaped portion of the rotatable valve member.

19. The fluid coupling according to claim 16, wherein the valve further comprises a seal between the bushing and the body.

20. A fluid coupling to couple a fluid source line to a fluid supply line, the fluid coupling comprising:
   a body defining a fluid flow path having an inlet and an outlet;
   a valve located within the body to control the flow of fluid through the flow path and operable between an open position, where fluid can flow through the body along the flow path, and a closed position, where fluid is prevented from flowing through the body along the flow path, and the valve having an actuator carried by the body for effecting the operation of the valve between the open and closed positions;
   a gladhand operable between a stored position and a use position, the gladhand comprising a face having an outlet, an inlet fluidly connected to the outlet of the body, and a flow path extending between the gladhand inlet and the gladhand outlet;
   a connector moveably coupling the gladhand to the body and effecting the relative movement of the gladhand to the body;
   wherein fluid is permitted to flow through the body and out the gladhand when the valve is in the open position and the gladhand is in the use position by the fluid entering the body flow path through the body inlet, exiting the body flow path through the body outlet, entering the gladhand flow path through the gladhand inlet, and exiting the gladhand flow path through the gladhand outlet.

21. The fluid coupling according to claim 20, wherein the connector comprises a swivel connection to permit the rotational movement of the gladhand relative to the body.

22. The fluid coupling according to claim 21, wherein the swivel connection is disposed between the valve and the gladhand.

23. The fluid coupling according to claim 20, wherein the body comprises an upper body portion and a lower body portion, wherein the lower body portion includes a nipple that is received within the upper body portion.

24. The fluid coupling according to claim 23, and further comprising at least one seal disposed between the nipple and the upper body portion.

25. The fluid coupling according to claim 24, wherein the connector comprises a swivel connection to permit the rotational movement of the gladhand relative to the body.

26. The fluid coupling according to claim 25, wherein the upper body portion comprises an arm to which the gladhand inlet is connected.

27. The fluid coupling according to claim 26, wherein the swivel connection comprises a biasing device to bias the arm such that the gladhand is in the stored position white permitting the rotating of the gladhand into the use position.

28. The fluid coupling according to claim 23, wherein a bearing is positioned between the upper body portion and the lower body portion.

29. The fluid coupling according to claim 23 and further comprising a mounting bracket, wherein the mounting bracket fixedly mounts the lower body portion and rotatably mounts the upper body portion.

30. The fluid coupling according to claim 29, wherein the mounting bracket comprises a support arm with a cover at its distal end, wherein the face of the gladhand rests against the cover when the gladhand is in the stored position such that the cover closes the gladhand outlet and prevents fluid from exiting and dust and debris from entering the gladhand fluid flow path.

31. The fluid coupling according to claim 20, wherein the valve comprises a rotatable valve member having a passageway located therethrough, wherein when the valve is in the open position, the passageway is substantially coaxial with the body flow path, and when the valve is in the closed position, the passageway is substantially transverse to the body flow path.

32. The fluid coupling according to claim 31, wherein the actuator comprises a handle to manually rotate the rotatable valve member from the open position to the closed position.

33. The fluid coupling according to claim 32, wherein the valve further comprises a bushing with a top surface adjacent the rotatable valve member, wherein the top surface forms a seal between the bushing and the rotatable valve member.

34. The fluid coupling according to claim 33, wherein the valve further comprises at least one biasing member to urge the bushing against the rotatable valve member.

35. The fluid coupling according to claim 34, wherein the rotatable valve member comprises a ball-shaped portion, and the bushing is urged against the ball-shaped portion of the rotatable valve member.

* * * * *